United States Patent [19]

Curry, Jr. et al.

[11] 4,305,073
[45] Dec. 8, 1981

[54] RADAR VIDEO COMPRESSION SYSTEM

[75] Inventors: Robert G. Curry, Jr., Severna Park; Edward L. Wallace, Ellicott City, both of Md.

[73] Assignee: The United States of America as represented by the Secretary of the Navy, Washington, D.C.

[21] Appl. No.: 116,700

[22] Filed: Jan. 30, 1980

[51] Int. Cl.³ .............................................. G01S 7/30
[52] U.S. Cl. .................................................. 343/5 SC
[58] Field of Search ...................................... 343/5 SC

[56] References Cited

U.S. PATENT DOCUMENTS

| 4,017,853 | 4/1977 | Brandao et al. | 343/5 SC X |
| 4,069,481 | 1/1978 | Easy et al. | 343/5 SC X |

*Primary Examiner*—T. H. Tubbesing
*Attorney, Agent, or Firm*—R. S. Sciascia; Henry Hansen; Armand M. Vozzo, Jr.

[57] ABSTRACT

A system for time-compressing radar video is disclosed to improve the graphic presentation thereof on a CRT display. Quantized input video is pipelined as cell pairs into and out of a pair of parallelly-arranged memory banks by means of input and output latches. The memory banks are controlled having alternating read and write modes which are interchanged in synchronism with the video scan period so that a preceding scan is read out of one bank at a controlled read clock frequency while a current scan is written into the other bank at a fixed write clock frequency, the degree of video compression being determined by the ratio of the read-to-write frequencies. A pair of series-connected rate multipliers each are fed 6-bit rate words for varying the read clock frequency on either a linear or non-linear scale. Video integration is provided at the inputs of each memory bank by magnitude comparators which compare stored contents of each range cell in the banks with current input video for the respective cell and steer multiplexers to either retain or rewrite the contents of the cell.

2 Claims, 4 Drawing Figures

RADAR VIDEO COMPRESSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to digital processing of radar video data and more particularly to a system and technique for providing near real-time video compression and read-while-write capability of the data to improve visual presentation thereof.

Modern radar displays commonly employ a cathode ray tube (CRT) device in conjunction with computer-generated graphic information (graphics) to enhance the radar video presentation. To effectively utilize such radar displays, it is desirable to maximize the time available for the graphics presentation and consequently, the graphics loading capability of the display, without the loss of real-time video. Generally, the graphics time available is inversely proportional to the selected radar range for displaying real-time video, assuming a constant pulse repetition frequency (PRF) for the radar. Therefore, for a certain refresh period during which character writings of the radar video must be rewritten on the CRT to avoid refresh degradation (an observable flicker), the maximum time generally available for graphics occurs when the minimum range is displayed in real time. For greater displayed ranges, the graphics time and loading capability decrease, and refresh degradation of the graphics presentation occurs as a result of rapid graphics overloads.

While various processing techniques have been developed for increasing the graphics time and loading capabilities of existing radar display systems, none have been entirely satisfactory throughout the selected display range scales without losing real-time video. One such technique used to complete the graphics presentation of a CRT display without flickering periodically ignores real-time video scan periods as the display range increases and the graphics load approaches the maximum capacity within the refresh period of the display. Furthermore, existing radar display systems have had to vary the writing rates of a scan trace of real-time video across the CRT as a function of the selected display range, and as a result, have been required to employ complicated compensating circuitry for readjusting the grid drive of the CRT to maintain a constant background brightness.

SUMMARY OF THE INVENTION

Accordingly, it is a general purpose and object of the present invention to provide a data processing system and technique for improving the presentation of radar video on CRT displays.

Another object of the present invention is to provide an improved method of digitally processing radar video for CRT display thereof in real-time whereby the time available for graphics presentation is maximized and the graphics loading capability is increased for all display ranges without refresh degradation and loss of real-time video.

Stil another object of the present invention is to provide a radar video compression system that permits the radar video to be displayed on a CRT at a constant writing rate thereby providing a fixed time interval for video display at any selected range scale.

A further object of the present invention is to provide a system of radar video compression that is reliable in operation and relatively inexpensive to manufacture.

Briefly, these and other aspects of the present invention are accomplished by a system for time-compressing radar video to improve the graphic presentation thereof on a CRT display. Quantized input video is pipelined as cell pairs into and out of a pair of parallelly-arranged memory banks by means of input and output latches. The memory banks are controlled having alternating read and write modes which are interchanged in synchronism with the video scan period so that a preceding scan is read out of one bank at a controlled read clock frequency while a current scan is written into the other bank at a fixed write clock frequency, the degree of video compression being determined by the ratio of the read-to-write frequencies. A pair of series-connected rate multipliers each are fed 6-bit rate words for varying the read clock frequency on either a linear or non-linear scale. Video integration is provided at the inputs of each memory bank by magnitude comparators which compare stored contents of each range cell in the banks with current input video for the respective cell and steer multiplexers to either retain or rewrite the contents of the cell.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1:
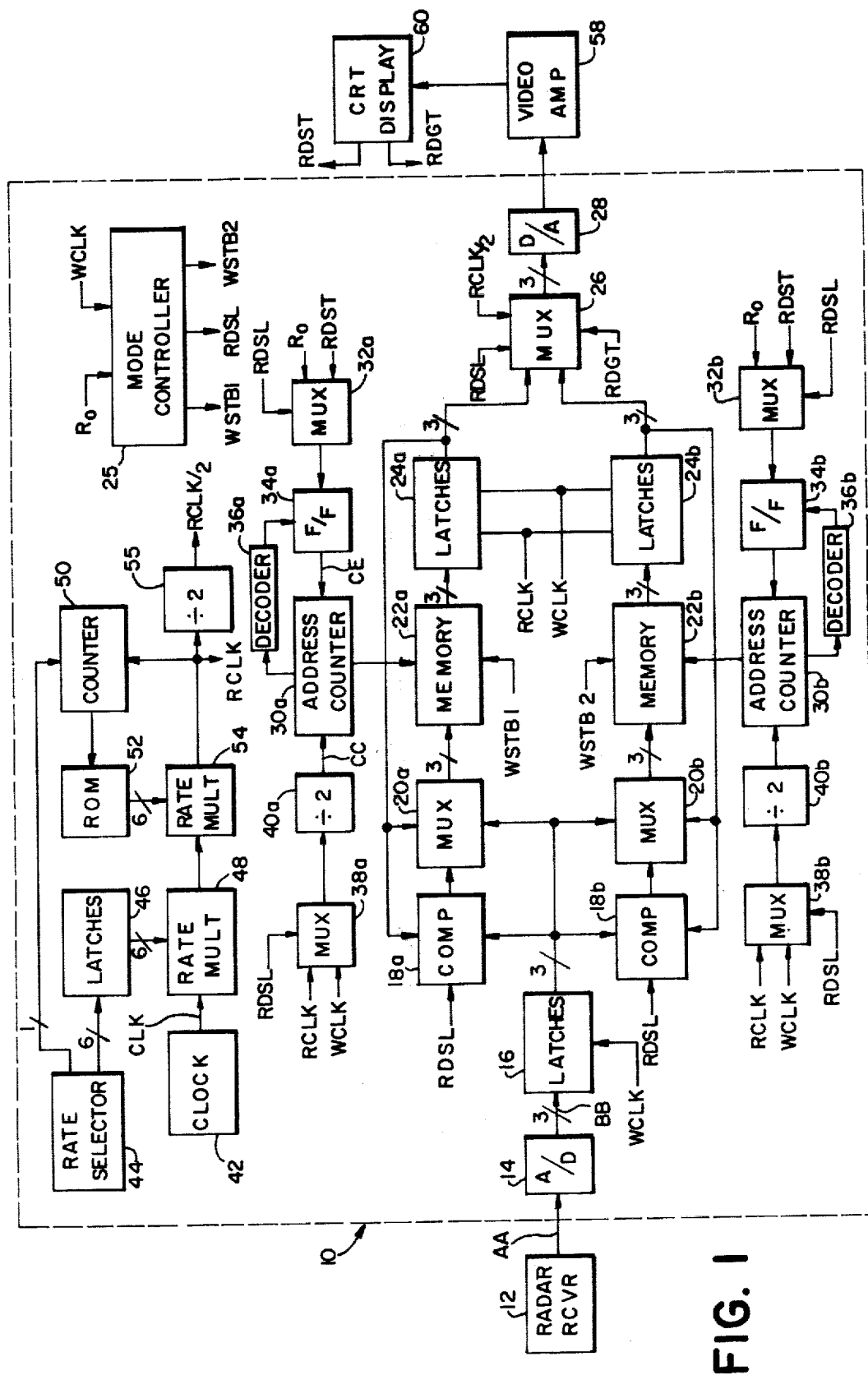
FIG. 1 is a block diagram showing the radar video compression system of the present invention incorporated in a radar display system.
Figure 2:
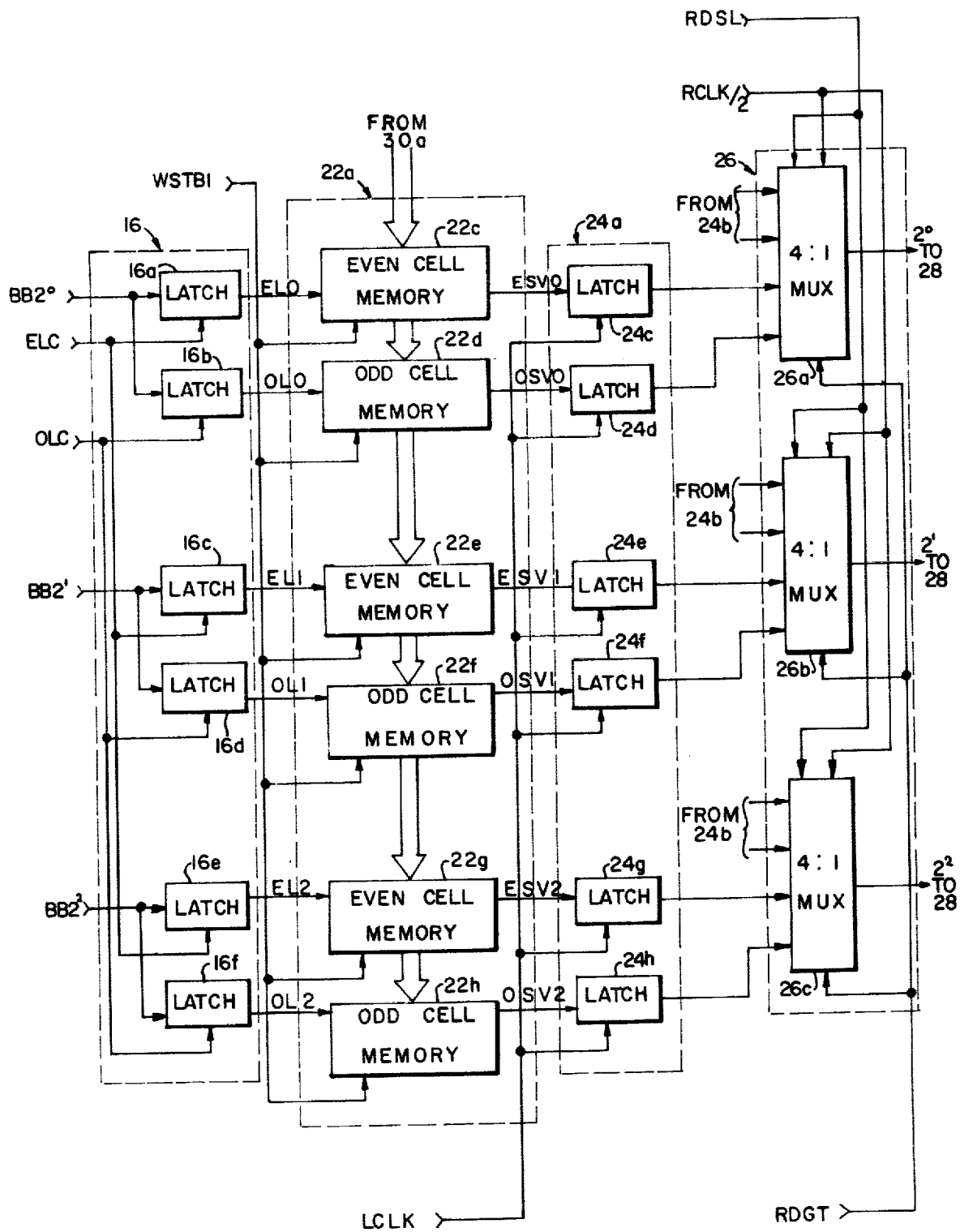
FIG. 2 is a block diagram showing the basic memory bank architecture of the compression system of FIG. 1 without video integration.
Figure 3:
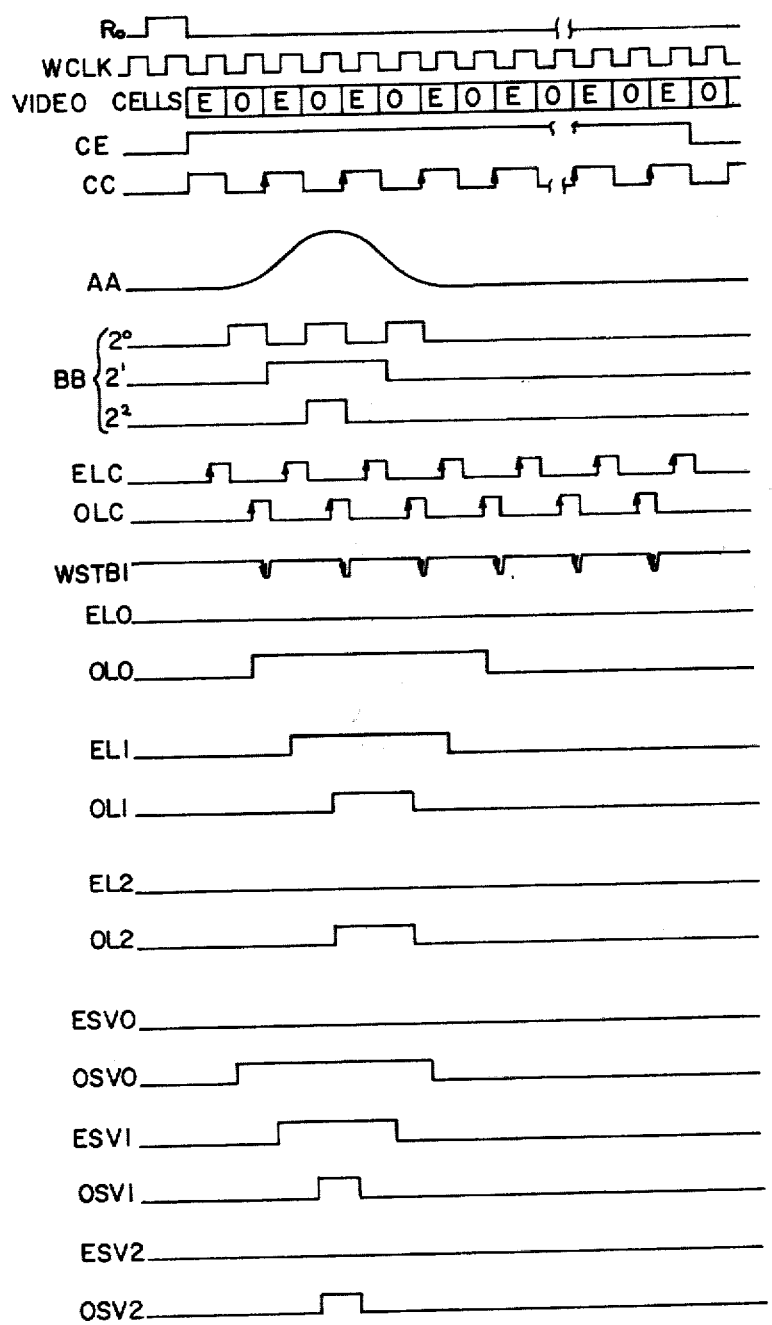
FIG. 3 is a timing diagram depicting various operating signals of the video compression system of FIG. 1 associated with the memory bank of FIG. 2 in a write mode of operation.

Referring now to FIGS. 1-4, there is shown a radar video compression system 10 according to the present invention for digitally processing radar video to permit enhancement of its visual presentation on a CRT display 60 having computer-generated graphics (not shown) associated therewith. The compression system 10 is connected to receive a raw radar video signal AA in analog form from a radar receiver 12. The input video signal AA, a typical waveform of which is shown in FIG. 3, represents an echo of radio-frequency energy that is picked up by receiver 12 some period of time after the energy was emitted by a radar transmitter (not shown) in the direction of a given area.

An analog-to-digital converter 14 receives the input video signal AA to provide a quantized video output BB consisting of 3-bits of information based upon the input signal. An array of input latches, generally designated 16, is strobed by a periodic train of write clock pulses WCLK, shown in FIG. 3, and connected to receive the 3-bit quantized video BB for loading the video therein as even (E) and odd (O) cell pairs at the write clock frequency thereby permitting pipelining of the video through the system 10, in a manner to be described in greater detail hereinafter. The write clock frequency, about 5 MHz as an example, represents the number of radar video samples made during a time period and is generally determined by the overall radar system range resolution requirements.

A pair of memory banks 22a and 22b are arranged in parallel branches from input latches 16 to receive the parallel cell pairs therefrom, as better shown in FIG. 2. The memory banks 22a and 22b, preferably high-speed random access storage devices, are organized in a 2048×3 configuration (2048 video cells of 3 bits each) and are controlled to be in alternating read and write modes so that one bank is available for writing while the other bank is available for reading, and vice versa. The read/write modes of memory banks 22a and 22b are interchanged in synchronism with the video scan period of the radar display in a manner to be described in greater detail hereinafter, thereby permitting a preceding video scan to be read out of one memory bank while a current video scan is being written into the other bank. A zero range trigger pulse Ro generated by conventional digital means (not shown) at the start of each video sweep to mark the video scan period is utilized to control mode switching of memory banks 22a and 22b by enabling the memory banks to begin video storage.

A mode controller 25, comprising digital logic elements of conventional design for the generation of output pulses that are time-related to input pulses, receives the zero range trigger pulses Ro and the write clock pulses WCLK. Therefrom, mode controller 25 is capable of producing a pair of identical write strobe pulse trains WSTB1 and WSTB2, which are fed to memory banks 22a and 22b respectively, and a read/write select trigger RDSL fed throughout the system 10 to enable either bank to be read at one time. The write strobe pulse trains WSTB1 and WSTB2 are internally gated within the mode controller 25 so that only the strobe train associated with the memory bank currently in the write mode is generated and fed to the respective memory bank, either 22a or 22b. The write strobe trains, WSTB1 and WSTB2, have a period twice that of the write clock WCLK and thereby control the introduction of the video cell pairs loaded in the input latches 16 into the respective memory banks 22a and 22b, transferring the loaded cell pairs into the memories at the moment indicated by the downward arrow on the write strobe pulse train shown in FIG. 3.

Magnitude comparators 18a and 18b and multiplexers 20a and 20b couple the output of the latches 16 to the input of memory banks 22a and 22b in their respective branches to provide integration of the incoming video being written into the banks. The comparators 18a and 18b are fed the existing stored contents of each 3-bit cell of its respective memory 22a and 22b via output latches 24a and 24b, respectively, and compare those contents with current incoming video for that cell received from the latches 16 when its respective memory bank is in a write mode. If the current incoming video is of a greater magnitude than the existing stored video, the comparators 18a and 18b steer the respective multiplexers 20a and 20b to write the current incoming video into the appropriate cell of the respective memories 22a and 22b. Otherwise, the comparators 18a and 18b steer the multiplexers 20a and 20b to retain the existing video by rewriting it back into the proper cell of the memory banks 22a and 22b. The video integration of the incoming video thus accomplished on a recirculating basis permits the system 10 to store a plurality of video scans before being required to paint a sweep on the CRT display 60 thereby increasing the time available for graphics presentation of the displayed video. It should be noted that comparators 18a and 18b may be controlled to vary the number of cycles of video integration or may be disabled when no video integration is desired. In the latter case, the outputs of the comparators 18a and 18b are forced to a steady state output thereby steering the respective multiplexers 20a and 20b to select only the current incoming video from latches 16.

A pair of address counters 30a and 30b are connected to respective memory banks 22a and 22b and are controlled to address the banks in either the read or write mode. Multiplexers 32a and 32b are coupled to respective address counters 30a and 30b via flip-flops 34a and 34b designed to provide an output signal CE that runs the address counters in accordance with inputs received by the multiplexers. Receipt of the zero range trigger pulse Ro by multiplexers 32a, 32b raises the level of the output signal CE of flip-flops 34a, 34b thereby enabling address counters 30a, 30b to run in the write mode. On the other hand, receipt by multiplexers 32a and 32b of a read start signal RDST from the control circuit of CRT display 60 and the read/write select trigger RDSL from mode controller 25 enables the respective address counter 30a and 30b to run in read mode. Decoders 36a, 36b associated with each address counter, 30a and 30b respectively, are set to a predetermined number of video cells desired for storage in memory banks 22a and 22b and reset the address counters via flip-flops 34a, 34b upon reaching the desired storage of cells thereby inhibiting the write mode for that respective memory bank.

Multiplexers 38a and 38b are connected to receive the write clock train WCLK and a read clock train RCLK, the generation of which is described in greater detail hereinafter. The multiplexers 38a and 38b under the control of the read/write select trigger RDSL steer the appropriate clock train to the respective address counters 30a and 30b via frequency dividers 40a and 40b that divide the clock train frequencies by a factor of two. Accordingly, the frequency dividers 40a and 40b output a clock signal CC to their respective address counters 30a and 30b running in either the read or write mode with the clock signal being WCLK/2 for the write mode and RCLK/2 for the read mode of operation.

The read clock train RCLK is generated from a periodic clock signal CLK provided by a read clock oscillator 42. A pair of variable rate multipliers 48 and 54 are series connected to the clock oscillator 42 to vary the frequency of the clock signal CLK, about 23 MHz as an example, via 6-bit rate control words that are fed into the respective rate multipliers. The 6-bit rate word for rate multiplier 48 is received from a set of latches 46 loaded by a rate selector 44 and determines the rate at which the multiplier operates to provide a constant read clock frequency for linear video display. Rate multiplier 54 is fed its 6-bit rate control word from a read-only memory (ROM) 52 having increasing address values that are read-out by an address counter 50. For linear video display, the counter 50 is preset by a one-bit signal from rate selector 44 so that the maximum 6-bit address value of the ROM 52 is read out to rate multiplier 54 thereby setting the rate thereof at a maximum and providing a constant read clock frequency in conjunction with rate multiplier 48. It should be noted that the read clock frequencies thus generated by the series-connected rate multipliers 48 and 54 determine the video compression factor of system 10 according to the ratio of the read-to-write clock frequencies.

For a non-linear video display, rate selector 44 enables the counter 50 to count the number of read clock pulses outputed from rate multiplier 54. Counter 50 is designed to readdress the ROM 52 periodically upon a predetermined number of read clock pulses so that the 6-bit rate word read from the ROM to rate multiplier 54 is dynamically varied. Accordingly, the rate of multiplier 54 increases logarithmically and the read clock frequency output of the rate multiplier approximates a logarithmic compression in range.

Figure 4:
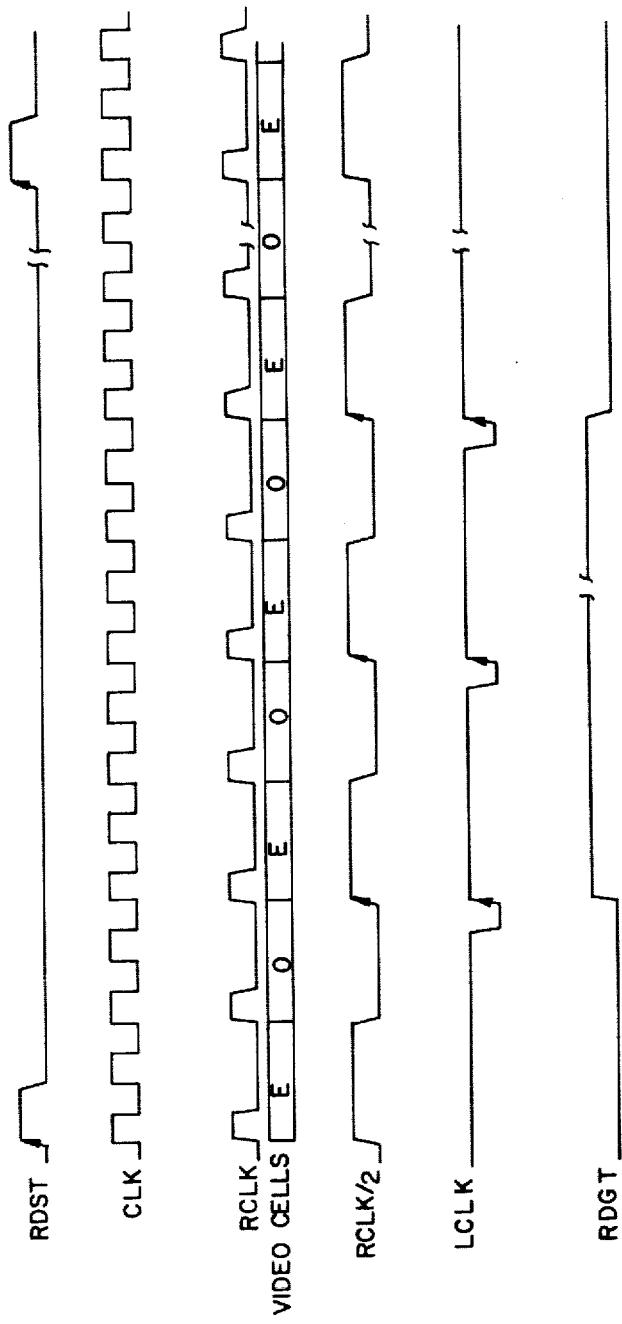
FIG. 4 is a timing diagram depicting various operating signals of the video compression system of FIG. 1 associated with the memory bank of FIG. 2 in a read mode of operation.

Latches 24a and 24b at the respective outputs of memory banks 22a and 22b temporarily retain the memory contents read therefrom in order to pipeline the video cell pairs from the memory banks to the output of the system 10 and to provide feedback of the existing memory contents to magnitude comparators 18a and 18b for video integration. As depicted in FIG. 4, the odd/even cell pairs read from memory banks 22a and 22b are latched in accordance with a latch clock LCLK at the moment indicated by the arrows marked thereon. Both latches 24a and 24b feed their parallel cell pairs to a time multiplexer 26 which, in accordance with the read/write select trigger RDSL, serially reads the cell pairs out at one-half the read clock frequency (RCLK/2). A read gate pulse RDGT input to multiplexer 26 from the control circuit of CRT display 60 marks the fixed period of time within which the video contents of the memory banks 22a and 22b are read out via latches 24a and 24b and time multiplexed for video display. It should be noted regarding FIG. 4 that there is a cell pair delay in the readout via read gate RDGT such that the memory readout is not valid until the first cell pair has been latched into output latches 24a and 24b. Also, the time duration of the read gate RDGT must be greater than or equal to the time required to readout the maximum number of stored cells at the maximum number of stored cells at the maximum selected read clock frequency.

A digital-to-analog converter 28 is connected to receive the 3-bit serial time-compressed video information from multiplexer 26. The D/A converter 28 provides an analog output signal indicative of the compressed digital video to a video amplifier 58 for signal enhancement. Amplifier 58 is connected to the grid drive of CRT display 60 and provides an enhanced video signal compressed in time to the display for presentation in near real-time.

In operation, the radar video compression system 10 pipelines quantized video BB as cell pairs into and out of alternating memory banks 22a, 22b by means of a set of latches 16 at the input of the banks and a pair of latch sets 24a and 24b at the outputs of the respective banks. The pipelining technique is one whereby input video cells are stored up at the relatively low incoming rate of the write clock train WCLK and stacked in even/odd pairs within input latches 16, subsequently to be "dumped" or fed from the latches and written into an appropriate memory bank 22a or 22b via respective address counters 30a and 30b. The video cell pairs are read from the memory banks 22a, 22b at the frequency of the read clock RCLK into the output latches 24a and 24b prior to being time-multiplexed by multiplexer 26 at the output of the system 10. In the pipelining scheme thus provided, the incoming serial video is loaded as parallel cell pairs for writing into and reading out of the memory banks 22a and 22b before being time-multiplexed back into serial form at the output. This technique improves the bandwidth quality of the video output by permitting the memory banks 22a and 22b to be written and read at higher than normal rates.

Incoming video is digitally integrated at the input of memory banks 22a and 22b using comparators 18a and 18b and associated multiplexers 20a and 20b. The existing contents of each 3-bit video cell is fed to the comparators 18a, 18b via latches 24a and 24b and compared with the current input video for that particular cell. If the current input video is of greater magnitude, it is written into the associated memory bank 22a and 22b. Otherwise, the existing range cell contents are retained.

Switching of the memory banks 22a and 22b between alternating read and write modes is triggered by the zero range trigger pulse Ro so that the modes are interchanged in synchronism with the video scan period. This synchronous switching provides the system 10 with a read-while-write capability whereby a preceding video scan is readout into the other memory, and permits near real-time video compression with the ratio of the variable read clock (RCLK) frequency to the fixed write clock (WCLK) frequency determining the compression factor.

Rate multipliers 48 and 54 are used to control the read clock frequency via 6-bit rate control words. The rate multipliers 48 and 54 are series connected with a clock oscillator 42, the rate word of multiplier of 48 being provided by rate selector 44 via latches 46 to provide a multiple of the input clock train CLK. Rate multiplier 54 uses a ROM 52 and address counter 50 connected in a feedback arrangement to dynamically vary its rate word as a function of the read clock pulses and provide for non-linear video display rates. The address value of ROM 52 are of increasing magnitude so that the read clock frequency approximates a logarithmic compression when counter 50 is enabled by rate selector 44. For linear video display, the feedback loop is disabled and the rate word from ROM 52 is fixed at its maximum value.

Therefore, it is apparent that the disclosed radar video compression system 10 provides a digital data processing system and technique for improving the presentation of radar video on CRT displays by providing near real-time video compression and a read-while-write capability that maximizes the time available for graphics presentation on the display and the graphics loading capability thereof for all display ranges without refresh degradation and loss of real-time video. In addition, the disclosed radar video compression system permits the video to be displayed on the CRT at a constant writing rate thereby providing a fixed time interval for video display at any selected range scale. Furthermore, the present invention provides a system of radar video compression that is reliable in operation and relatively inexpensive to manufacture.

Obviously, other embodiments and modifications of the present invention will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

We claim:

1. A method of time-compressing incoming radar video for display on a cathode ray tube, comprising the steps of:

quantizing the incoming radar video to produce binary-coded cells of information indicative of the incoming video;

latching the binary-coded cells in pairs at a fixed latch rate;

pipelining the latched cell pairs into and out of a pair of parallel random-access memories by writing the latched cell pairs into said memories at a fixed write rate, said write rate being one-half of said latch rate, and by reading stored cell pairs out of said memories at a variably-controlled read rate greater than said write rate;

synchronously switching said memories to permit the stored cell pairs to be read out of one of said memories at the same time that latched cell pairs are being written into the other of said memories; and recirculating the pipelined cell pairs to provide integration of the incoming video so that a plurality of scans of the incoming video may be stored before sweeping a display on the cathode ray tube, said recirculating including latching the stored cell pairs at the output of said memories, comparing the magnitude of the output latched cell pairs with latched cell pairs at the input of said memories, and writing the input latched cell pairs into respective ones of said memories when the magnitudes of the input latched cell pairs are greater than the output latched cell pairs.

2. A radar video compression method according to claim 1, wherein said step of pipelining comprises:

reading stored cell pairs out of said memories at a substantially logarithmic rate for non-linear video display on the cathode ray tube.

* * * * *